United States Patent
Singh et al.

(10) Patent No.: US 7,602,780 B2
(45) Date of Patent: Oct. 13, 2009

(54) SCALABLY DETECTING AND BLOCKING SIGNATURES AT HIGH SPEEDS

(75) Inventors: Sushil Kumar Singh, San Diego, CA (US); George Varghese, Sunnyvale, CA (US); John David Huber, San Diego, CA (US); Sumeet Singh, Fremont, CA (US)

(73) Assignee: Cisco Technology, Inc., Santa Clara, CA (US)

( * ) Notice: Subject to any disclaimer, the term of this patent is extended or adjusted under 35 U.S.C. 154(b) by 590 days.

(21) Appl. No.: 11/271,310

(22) Filed: Nov. 9, 2005

(65) Prior Publication Data

US 2006/0098652 A1    May 11, 2006

Related U.S. Application Data

(60) Provisional application No. 60/522,809, filed on Nov. 9, 2004.

(51) Int. Cl.
*H04L 12/56* (2006.01)
(52) U.S. Cl. .......................... 370/389; 726/13
(58) Field of Classification Search ................ 370/242, 370/255, 256, 389, 392, 395.1, 395.32, 395.52, 370/412, 429; 709/713; 726/11, 13, 26, 726/30
See application file for complete search history.

(56) References Cited

U.S. PATENT DOCUMENTS

2003/0053448 A1 *   3/2003   Craig et al. ................. 370/353

OTHER PUBLICATIONS

Estan, C. , et al., "New Directions in Traffic Measurement and Accounting", *UCSD Technical Report CS2002-0699*, (Feb. 2002), 62 p.

* cited by examiner

*Primary Examiner*—Chirag G Shah
*Assistant Examiner*—Yong Zhou
(74) *Attorney, Agent, or Firm*—Schwegman, Lundberg & Woessner P.A.

(57) ABSTRACT

A method and apparatus is described for identifying content in a packet. The method may obtain data sample from the packet where the data sample is in a predetermined window at an initial offset point in the packet. For each offset point, a first stage of processing on the data sample may be performed to identify if the data sample corresponds to potentially relevant reference string. A more focused second stage of processing may then be carried out on the data sample to identify if the data sample corresponds to potentially relevant reference string. Thereafter, an even more focused third stage of processing may be carried out on the data sample to obtain a third stage result. If the data sample passes all three stages of processing, a predefined action is identified which is associated with a reference string corresponding to the data sample.

31 Claims, 13 Drawing Sheets

SCALABLY DETECTING AND BLOCKING SIGNATURES AT HIGH SPEEDS

CLAIM OF PRIORITY

This patent application claims the benefit of priority, under 35 U.S.C. Section 119(e), to U.S. Provisional Patent Application Ser. No. 60/522,809, filed on Nov. 9, 2004, the entire content of which is incorporated herein by reference.

TECHNICAL FIELD

This application relates to a method and apparatus to identify content in packets.

BACKGROUND

A packet or datagram is a piece of a message transmitted over a packet-switching network. An example of a packet-switching network is the Internet where enormous quantities of data are communicated between various network points. In the Internet environment, content to be communicated between two endpoints is broken up into packets and these packets may follow different paths whilst travelling between the endpoints. It will be appreciated that the contents of packets may be benign or malicious.

An example of malicious content in a packet is data associated with viruses, computer worms, or the like. In these circumstances, it may be advantageous to identify the content in packets and thus identify the presence of these malicious viruses, worms, or the like. The content in a packet may thus have a "signature" which may identify the content and, when identified, allow appropriate action to be taken to reduce the likelihood of infection.

It is also useful to identify the content in a packet to facilitate content routing. For example, a packet may be routed to a specific server based on the content in the packet. In other embodiments, the content in the packet may be used to enforce copyright protection, to perform rate limiting (e.g. rate limiting in peer-to-peer traffic based on content signatures because often such traffic tunnels in under standard web ports and can only be identified by content signatures), to perform monitoring of Voice over IP (VoIP) conversations (e.g. tapping a VoIP phone), and other networking applications.

It will thus be appreciated that the monitoring or identification of the content in packets is of considerable value and only a few example applications are described above.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiment of the present invention. It will be evident, however, to one skilled in the art that the present invention may be practiced without these specific details.

An embodiment utilizes a multi-stage approach in identifying or monitoring content in a packet. For example, a first stage of the monitoring or identification process may be performed at system speed, for example, at a speed at which a packet stream is received and processed. In an embodiment, subsequent stages of the processing may be done at a reduced speed that is lower than the system speed. Data sample may be obtained from the packet wherein the data sample is obtained using a window at an initial offset point in the packet. Further data sample is then obtained as the window is sequentially moved along the packet. Thus, a plurality of samples each offset by a size of the sample window may be obtained.

In a first stage of processing, a probability analysis may be performed to identify the likelihood of a particular sample corresponding to reference data. The reference data may define the particular content (e.g., a reference string) that is being searched for in each packet. After the first stage of processing has identified samples that could possibly be relevant, and thus correspond to a reference string in a reference database, one or more further stages of processing are carried out to perform a more detailed analysis of the data sample.

In an example embodiment, the first stage of processing is performed by deriving a hash from each data sample and querying a multi-stage filter with the hash to obtain a first result. In a second stage of processing, a second hash may be derived which is then utilized to index a bit tree. It is important to appreciate that not all data samples or packets necessarily proceed to the second stage of processing. Thus, the first stage of processing may eliminate the requirement of a more computationally intensive second stage analyzing each of every data sample. Further, as described in more detail below, in an embodiment, a third stage of processing may be performed to determine if an exact match exists between the sample and a reference data string. In an embodiment, a checksum may be performed prior to performing an exact match.

Figure 1:
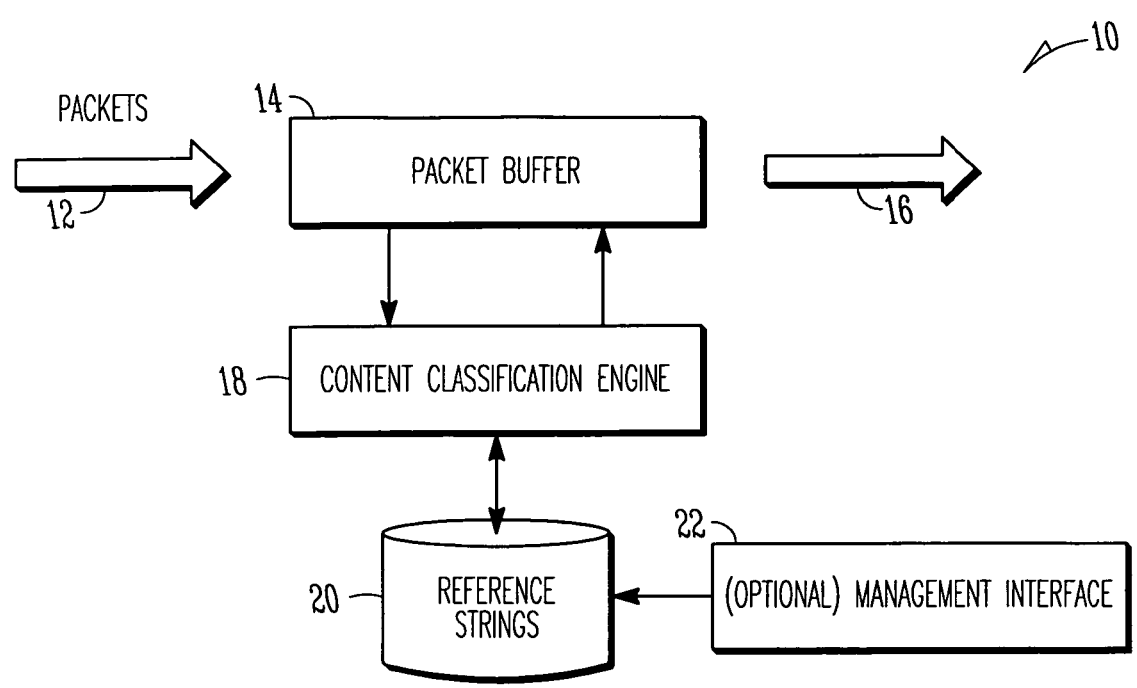
FIG. 1 shows apparatus, in accordance with an example embodiment, to identify or monitor content in a packet.

Referring to FIG. 1, reference 10 generally indicates apparatus, in accordance with an embodiment, to identify or monitor content in a packet. For example, the apparatus 10 may be included in a router, a switch, or any other electronic device that processes packets. As shown by arrow 12, a packet stream may be received and each packet may then be stored in a packet buffer 14. Packets from the packet buffer 14 may subsequently be communicated to another device as shown by arrow 16. The apparatus 10 is also shown to include a content classification engine 18, a reference strings database 20 and, optionally, a management interface 22. Broadly, the content classification engine 18 receives data samples in a pre-selected or defined window from each packet received and analyzes or processes the data sample to identify whether or not it contains any one of a plurality of reference string stored in the reference strings database 20. In order to analyze the content in an entire packet, the window is moved sequentially from offset point to offset point within the packet and, in an example embodiment, the window width corresponds to a string length of the smallest reference string in the reference strings database 20. As descried in more detail below, the content classification engine 18 then performs a multi-stage packet analysis process wherein it first identifies packets that could potentially include a relevant string and, thereafter performs subsequent processing in further stages when the likelihood that the string is in fact included in a particular sample is greater. The optional management interface 22 may be used to define the reference strings, update the reference strings, and perform other functionality required to define the reference strings in the reference strings database 20 and, in an embodiment, generate data in a multi-stage filter and bit tree utilized to perform example second and third stages of the processing.

In an embodiment, the reference strings database 20 includes a plurality of reference strings (e.g. 100,000 reference strings) and, each reference string may have a corresponding or associated defined action. It will be appreciated that the particular action may be dependent upon the nature of the particular reference string and the environment in which the apparatus 10 is deployed. For example, where a reference string is used to identify a virus or worm, the action may be specific to prevent infection of any computer system. However, in a content routing environment, where the packet is routed dependent on the content of the packet, the defined action may identify a destination for the packet. For example, actions associated with a particular reference string may include a block action (e.g., any packets that match the string should be destroyed), a TCP reset action (e.g., a TCP reset may be sent to the two ends of the TCP connection that the packet is part of), an alert action (e.g., an alert message (or the entire packet) may be sent to a management station with the information contained in the packet), a log action (e.g., may be similar to an alert action except that the message is sent to a system log file such as syslog), a route action (e.g., the packet may be routed to the destination specified in the action), a rate limit action (e.g., packets containing specified content may be rate limited, e.g., specifying a drop probability within the content string), or the like. It will also be appreciated that a combination of the aforementioned actions (or any arbitrary action(s)) may be associated with any one or more of the strings. These actions may be defined or specified, for example, using the management interface 22. Thus, any reference string may be defined and any appropriate action associated with the reference string may be performed when the reference string is identified in a packet received in an incoming packet stream (see arrow 12).

It should be noted that the manner in which the content classification engine 18 acquires a packet or any data sample forming part of the packet may vary from embodiment to embodiment. For example, in an embodiment where the apparatus 10 is deployed in a router or switch, the apparatus 10 may receive all packets in a packet stream and inspect or process them to identify the presence of any reference strings and, thereafter, pass them to its output (e.g., a forwarding engine on a switch or a router). Accordingly, in an example embodiment, the packets may flow through the apparatus 10. However, in another example embodiment, the apparatus 10 may function in a "tap" mode which taps packets from a packet stream.

In an example embodiment, the content classification engine 18 may predicate or add to packet header data corresponding to an action identified in the reference strings database 20. Thus, the apparatus 10 may then identify a particular action associated with a reference string and include action data corresponding to the reference string with the packet which is then communicated to a further processing device (see arrow 16).

Figure 2:
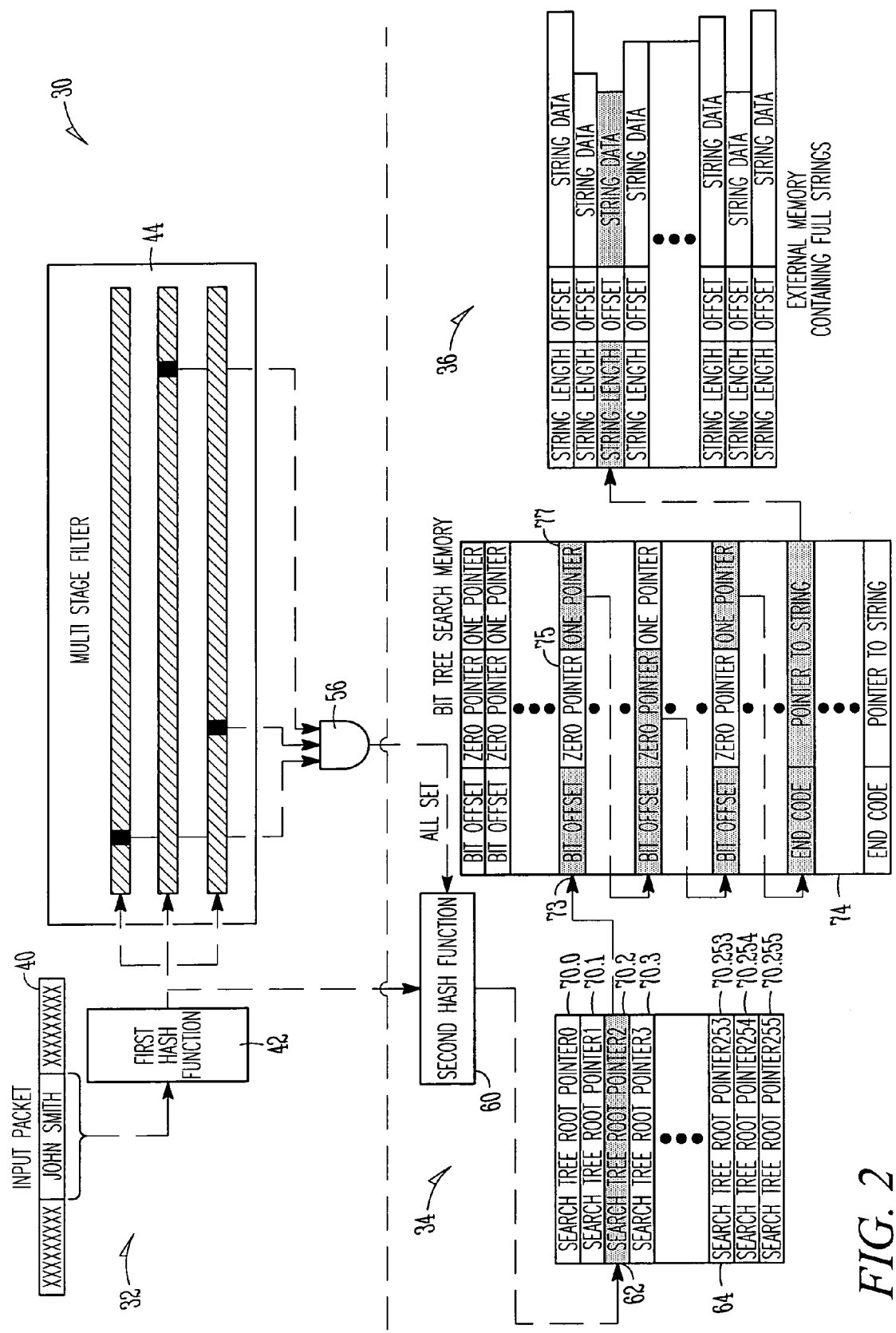
FIG. 2 shows a content classification engine in accordance with an example embodiment.

Referring to FIG. 2, reference 30 generally indicates a content classification engine in accordance with an example embodiment. The content classification engine 30 shown by way of example to include three processing stages. A first processing stage 32 may perform probabilistic offset checking and, if the data sample passes the checking in the first processing stage 32, the functionality of a second processing stage 34 may be performed. Thereafter, if the data sample passes the second processing stage 34, the data sample may then be processed in a third processing stage 36.

In the first processing stage 32, a data sample in a window, which sequentially moves along an input packet 40, is fed into a hash function/component 42 which generates a hash from the data sample and queries a multi-stage filter 44 which has been pre-populated or configured with data corresponding to the reference strings stored in the reference strings database 20. The configuration of the multi-stage filter 44 is described in more detail with reference to FIG. 3.

Figure 3:
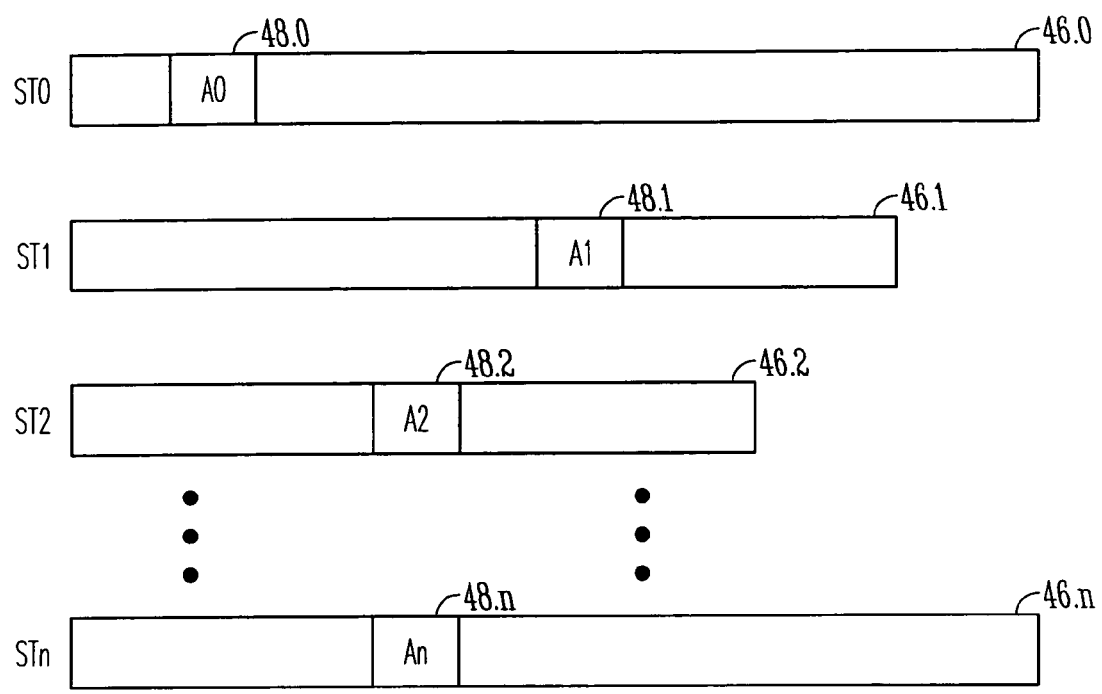
FIG. 3 shows examples of reference strings used to identify content in a packet.

FIG. 3 shows examples of reference strings (ST0-STn) 46.0-46.n used to identify content in a packet. Each of the strings 46.0-46.n may have one or more associated actions and, when a particular string is identified in an incoming or input packet 40, the specific action may be performed or included within the packet for communication along a communication channel. When configuring the multi-stage filter 44, an anchor string 48.0-48.n is selected or identified in each reference string 46.0-46.n. Each anchor string 48.0-48.n is typically a number of bytes (e.g., 8 bytes) in the particular string and the first processing stage 32 checks for the presence of these anchor strings in the incoming or input packets 40. It is important to note that each anchor string 48.0-48.n may selected at any point in a reference string 46.0-46.n. and is thus not limited to selection as the first or last bytes in a reference string 46.0-46.n. It will be appreciated, as each anchor string 48.0-48.n is only a subset of the corresponding total reference string 46.0-46.n that is being searched for. Further, the first processing stage 32 may merely indicate a likelihood of the particular reference string being present in the packet 40 as only a portion of the reference string is being investigated.

Figure 4:
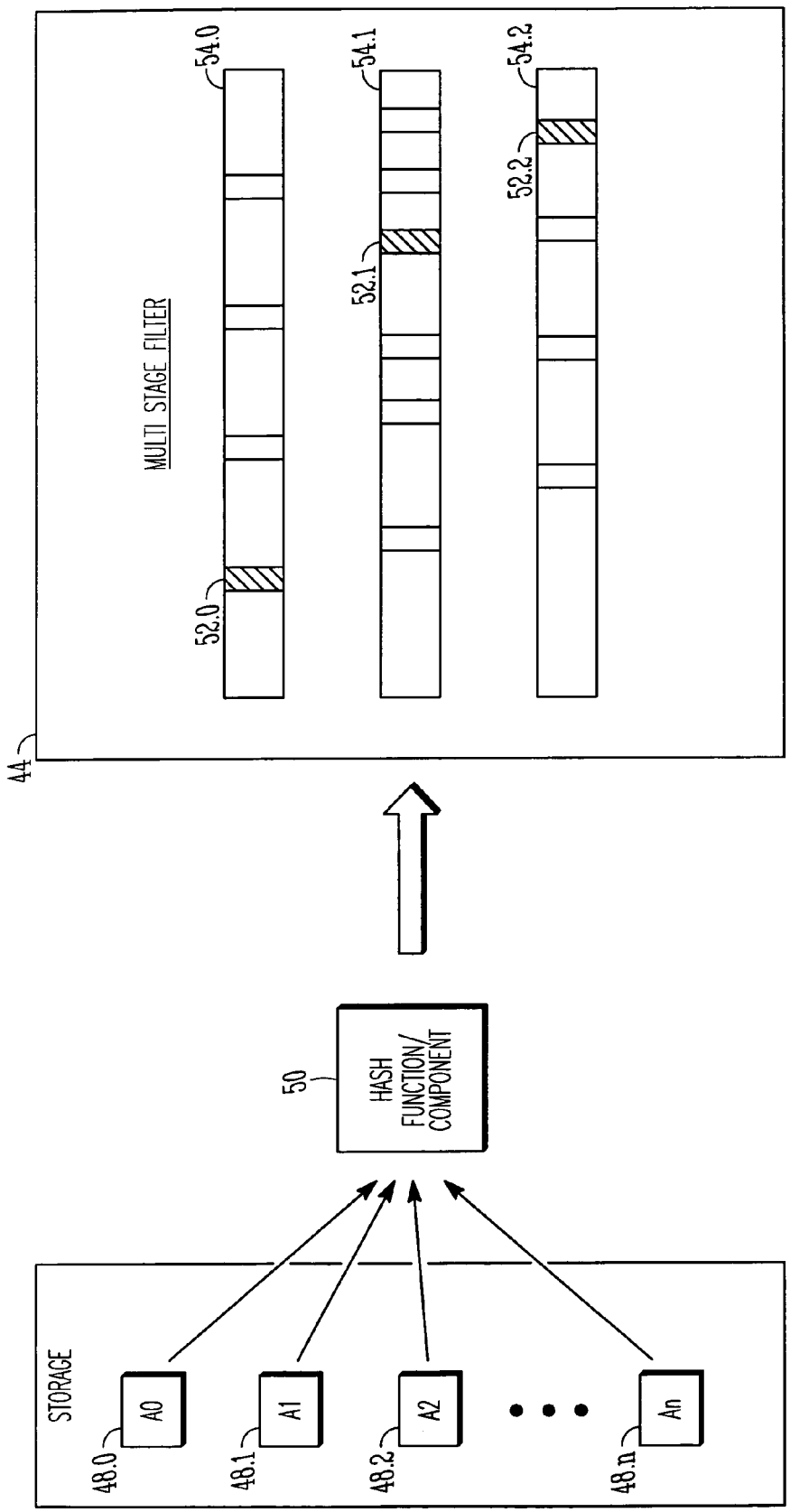
FIG. 4 shows a method, in accordance with an example embodiment, to configure a multi-stage filter of the content classification engine of FIG. 3.

An example of the configuration of the multi-stage filter may be as follows. An anchor string 48.0 may be selected from the reference string 46.0, an anchor string 48.1 may be selected from the reference string 46.1, an anchor string 48.2 may be selected from the reference string 46.2, and an anchor string 48.n may be selected from the reference string 46.n. Thereafter, as shown in FIG. 4, the anchor strings 48.0-48.n are each fed into hash function/component 50 and each corresponding hash is then mapped to the multi-stage filter 44. A different hash may be used for each array of the multi-stage filter when mapping the anchor strings 48.0-48.n to the array. For example, the anchor string 48.0 may be hashed with a first hash and mapped to a location 52.0 in a first array 54.0, hashed with a second hash and mapped to a location 51.2 in a second array 54.1, and hashed with a third hash and mapped to a location 52.2 in a third array 54.2. It will, however, be appreciated that more or less arrays may be provided in different embodiments.

It will thus be appreciated that during initial configuration a "fingerprint" of each anchor string 48.0-48.n is created in the multi-stage filter 44 and, as the anchor strings 48.0-48.n are extracted from only a portion of the reference strings 46.0-46.n, the mapping provided in the multi-stage filter 44 may correspond to more than one reference string. Thus, the mapping of one string may overlap with the mapping of another string and thus querying of the multi-stage filter only provides an indication of a possibility that the data sample corresponds to a reference string. In an example embodiment, the arrays 54.0-54.2 may be 400×1 bit memories and the multi-stage filter 44 may be implemented in SRAM that is provided on chip to enhance processing speeds.

Returning to FIG. 2, as described above, a data sample in each window is selectively extracted or obtained from the input packet 40 and fed through the hash function/component 42 which uses the same hashing function(s) as the hash function/component 50. Accordingly, when the multi-stage filter 44 is queried in the first processing stage 32, it may be determined what the likelihood is that the data sample corresponds to at least one of the reference strings 46.0-46.n. In particular, the first processing stage 32 monitors whether or not the data sample potentially corresponds to one of the anchor strings 48.0 to 48.n. For example, if the data sample obtained from the input packet 40 corresponds to the anchor string 48.0, then location 52.0, 52.1, 52.2 in the multi-stage filter 44 would be set at "1". However, if any of the bits in locations 52.0, 52.1, and 52.2 are "0" then it may be said with certainty that the data sample does not correspond to any of the reference strings 46.0-46.n. Thus, the first processing stage 32 may provide an initial screening stage which does a broad probabilistic analysis or checking to determine whether or not it is worthwhile to perform further or more detailed analysis on the particular data sample.

The example multi-stage filter 44 is shown to include, by way of example, three arrays 54.0-54.2. Accordingly, in an example scenario where each array is four times the maximum string length, the probability of an identified data packet corresponding to a reference string may be (¼)×(¼)×(¼). Thus, although it may not be determined with certainty that the data sample includes one of the reference strings, there is a probability or likelihood that the data sample includes one of the reference strings. Further, it will be appreciated that the probability may be further enhanced by increasing the number of arrays 54.0-54.2. The hash function performed by the hash function/component 42 may be a function of the depth of the multi-stage filter 44.

As mentioned above, if the data sample in the packet matches the data in the multi-stage filter 44, and thus a "signature" of the data sample corresponds with a "signature" of an anchor string 48.0-48.n in the multi-stage filter 44, further processing on the particular data sample may be performed by the second processing stage 34. In the example embodiment shown in FIG. 2, an AND function 56 is utilized to determine if the signature of the data sample in the input packet 40 corresponds to the signature of the reference string in the multi-stage filter 44. The functionality described herein may be deployed in hardware and, accordingly, the AND function 56 may be hardwired.

It will be appreciated that if there is no correspondence between the signature of the data sample and the signature in the multi-stage filter 44 generated from the anchor strings 48.0-48.n, no further analysis need be performed on the particular sample. It will also be appreciated that the analysis of the data sample need not be done serially and that the content classification engine 18 may include a plurality of first, second and third processing stages 32, 34, 36. Each processing stage may process a data sample of a window located at a different point in the input packet 40. In an example embodiment, points are offset by 1 byte. Further, in the example embodiment shown in FIG. 2, it will be appreciated that the second processing stage 32 is only entered if all of the reference points or locations 52.0-52.2 are "1". If any one of the reference points or locations 52, 0-52.2 is "0" there is no correspondence between the signature of the data sample and that provided in the multi-stage filter 44 and no further processing of the particular data sample is required.

By way of example, assuming that the string "John Smith" is included in the input packet 40, the processing by the first processing stage 32 may be as follows. A hash on a minimum window width may be performed by the hash function/component 42 where the minimum window width is equal to L which may be the minimum length among all the strings 46.0-46.n. In an example embodiment, the window that may be used to represent a string may be the first L characters in the string. However, it will be appreciated that any number of L consecutive characters can be used for each string. For example, assuming two strings "John Doe" and "John Smith" are provided as reference strings and L is selected as four, then the first four characters of the window into both strings will produce an identical result as both strings commence with "JOHN". Accordingly, as described in more detail below, these two strings may be provided in the same group. However, by selecting the first four characters in the first string and the last four characters in the second string "JOHN" will be provided in a window for the first string and "MITH" will be provided in the second string. Thus, it will be appreciated that various different criteria may be used to select the length of the anchor, which particular portion of the reference string is to define the anchor string, and so on.

In an example embodiment, the multi-stage filter 44 is a simple data structure as described "New Directions in Traffic Measurement and Accounting" by Cristian Estan and George Varghese (UCSD technical report CS2002-0699, February 2002), the contents of which is included herein by reference, and may comprise K arrays of bits (only three example arrays 54.0-54.2 are show in FIGS. 2 and 3). As described above, hash value(s) may be used to compute an index into each of the K arrays of bits. If all the query bits are 1, a possible match is identified and further investigation of the data sample is then required. As described in more detail, the processing in the second processing stage 34 may, optionally, include a different hash function(s). However, if there is a match, it does not necessarily mean that there is a corresponding match in the reference strings database 20 but merely a possibility of such a match occurring. It will be appreciated that by increasing the size of each bitmap and the number of arrays provided in the multi-stage filter 44, false positives may be reduced. False positives may be eliminated subsequent processing stages.

In the second processing stage 34, a second hash function/component 60 is provided to generate a pointer 62 that points to memory such as a bit tree root memory 64. It will be appreciated that, as in the stage of the multi-stage filter 44, the bit root memory 64 requires configuration based on the reference strings in the reference strings database 20. Configuration of the example bit tree root memory 64 is described below with reference to FIG. 5.

Figure 5:
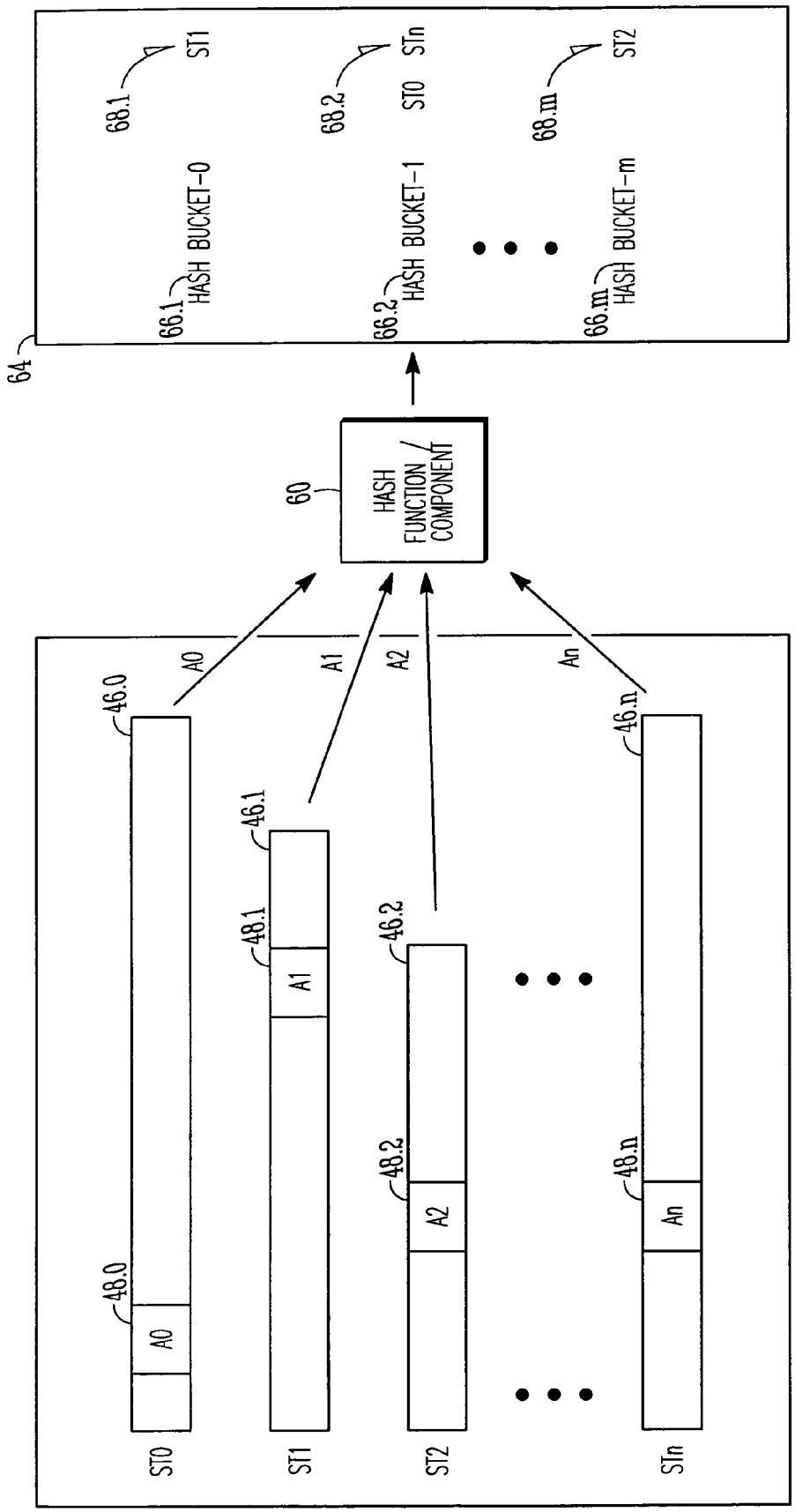
FIG. 5 shows a method, in accordance with an example embodiment, for grouping reference strings into a plurality of hash buckets or groups.

FIG. 5 shows a method, in accordance with an example embodiment, for grouping reference strings into a plurality of hash buckets or groups and, in response thereto configuring a bit tree root memory. In the example embodiment, the anchor strings 48.0-48.n of each reference string 46.0-46.n are feed into to the hash function/component 60 and the resultant hashes are divided into a plurality of hash buckets or groups 66.1-66.m. Thereafter, each reference string 46.0-46.n is placed in the same hash bucket 66.1-66.m that its hash corresponds to (as generally indicated by arrows 68.1-68.m). It will be noted that two or more of reference strings 46.0-46.n may fall into a single or the same hash bucket 68.1-68.m. For example, the reference strings 46.0 and 46.n may fall into hash bucket 66.2. In the example embodiment, the content classification engine 30 is shown to use two different hash functions in the first processing stage 32 and in the second processing stage 34, namely, hash functions/components 42 and 60. However, it will be appreciated that the same hash function may be used in both processing stages and that the second hash function/component 60 may be derived directly from the data sample of the input packet 40.

In an example embodiment, a hash table of 256 elements may be used to divide up to the reference strings into groups or hash buckets 66.1-66.m that may have an average size of N/256 (the total number of reference strings 46.0-46.n divided by the number of elements). Accordingly, after the indexing of the second hash function 60 into the bit tree root memory 64 the size of the suspect list of potentially matching signatures in the reference strings database 20 may be reduced by a number roughly equal to the hash table size (in practice there may be a small amount of random variation and it will be appreciate that the reduction is implementation specific). Thus, as described herein, a bit tree root memory 64 may be generated from the reference strings 46.0-46.n and the bit tree root memory 64 may then be stored, for example, off-chip in DRAM. It will be appreciated that, as not all packets pass from the first processing stage 32 to the second processing stage 34, the second processing stage 34 need not be performed at a system speed as may be the case in the first processing stage 32.

Thus, performing the second stage of processing 34 may index an array provided off-chip and the third stage of processing 36 on the data sample may include performing a comparison with the reference string and the content of the packet, the reference string 46.0-46.n being provided in off-chip memory. Further, the comparison may start before the offset in the packet where the data sample was located and the comparison can extend beyond the length of the data sample. It will be appreciated that the starting position and comparison length may be specified by the result of the bit tree search. Further, in the third processing stage 36 of checking for the string can go backwards by an offset (as specified in the bit tree) and forward up to a length (specified by a length in the bit tree) for the search process.

Returning to FIG. 2 and the inspection of the incoming data packet 40, after a particular data sample has been identified in the first processing stage 32 as potentially relevant, the data sample is then processed in the second processing stage 34. In particular, the data sample, as described above, is hashed by a second hash function/component 60 (corresponding to the hash used when configuring the bit tree root memory 64 as shown in FIG. 5) and the hash is then used to identify a search tree root pointer 70.0-70.255. For example, the hash function may identify search tree root pointer 70.2 which corresponds to one of the hash buckets 66.1-66.m. At this point in the process, the data sample in the window is identified as potentially corresponding to one of the strings 46.0-46.n included within the hash bucket 66.1-66.m. For example, search tree root pointer 70.2 may correspond to hash bucket 66.2 (e.g., see pointer 73 in FIG. 2) which includes search strings 46.0 and 46.n. As in the case with the multi-stage filter 44, the bit tree root memory 64 and the corresponding derivation of the hash bucket 66.1-66.m is only based on an anchor string 48.0-48.n which corresponds to a sub-portion of the reference strings 46.0-46.n and, accordingly, only provides an indication of a possibility that the data sample corresponds to one of the anchor strings 48.0-48.n. Thus, in an embodiment, each hash bucket 66.1-66.m may contain a number of possible matching reference strings, which may be of different length, and that have been hashed into a particular hash bucket 66.1-66.m.

Figure 6:
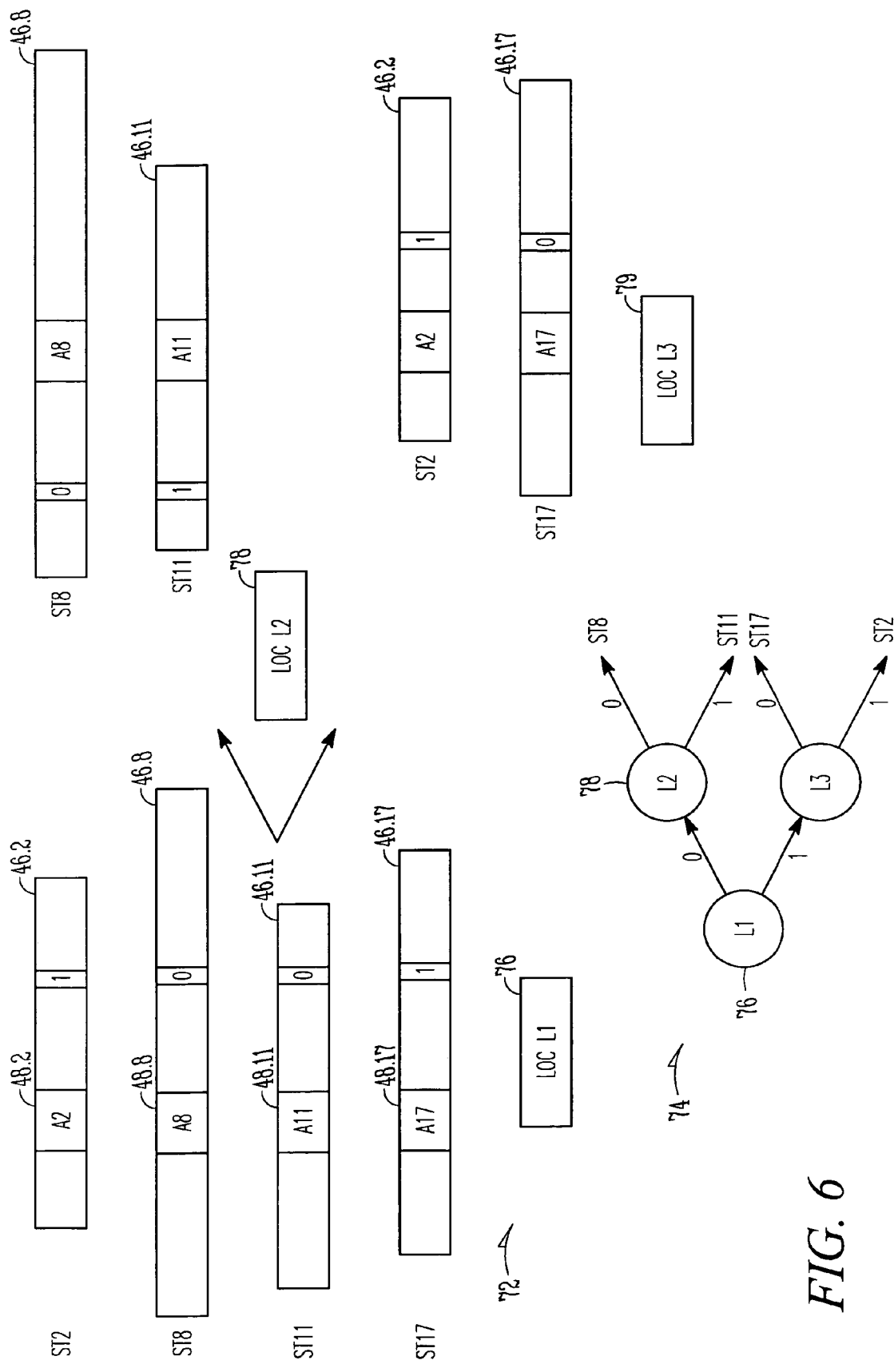
FIG. 6 shows an example hash bucket including a reference strings that have been grouped into the bucket based on hashing of anchor strings provided in the reference strings.

A single hash bucket 72 is shown in FIG. 6, by way of example, to include four different reference strings that have been allocated to the hash bucket 72 based on hashing of anchor strings provided in the associated reference strings. In particular, example reference strings 46.2, 46.8, 46.11 and 46.17 are shown to be included in the hash bucket 72. These reference strings 46.2, 46.8, 46.11 and 46.17 are grouped in the particular hash bucket 72 as their anchor strings 48.2, 48.8, 48.11 and 48.17 generated the same or similar hash. In an embodiment, the next step in the method may then be to identify which particular reference string 46.2, 46.8, 46.11 and 46.17 the data sample in the input packet 40 corresponds to. In an embodiment this is accomplished using a bit tree search memory 74 (see FIG. 2). The bit tree search memory 74 sequentially narrows down the investigation to a single reference string from a plurality of reference strings in a particular hash bucket 66.1-66.m by performing a bit-by-bit analysis at each location (if necessary). It will be appreciated that a hash group 66.1-66.m may only a single reference string thereby immediately identifying the potentially matching reference string. The number of levels traversed in the bit tree search memory may thus depend upon the number of strings in a particular hash bucket 66.1-66.m.

When processing the data sample, the bit search memory 74 is used to perform a bit-by-bit identification of each bit in each reference string at a plurality of locations 76 (see FIG. 6). Reference strings that have the same bits in the particular location 76 are then grouped. For example, as shown in FIG. 6, reference strings 46.8 and 46.11 both have a "0" at the specific location 76 and are thus grouped. Likewise, reference strings 46.2 and 46.17 both have a "1" in the specific location 76 and, accordingly, are also grouped. Thereafter, bits in a second location 78 are compared to further eliminate possible groups. Finally, in the given example, bits in location 79 are investigated thereby identifying reference string 46.2 as the potentially matching reference string. Thus, after all locations in the particular data sample have been compared, the second stage of processing 34 may reduce or identify a single reference string that may be a potentially relevant reference string in that the data sample corresponds to the anchor string of the reference string. Thus, the second processing stage 34 may identify a single string from a plurality of reference strings and further processing may then be limited to the particular reference string.

Thus, in an embodiment, a bit tree may be used to test a set of bits thereby to either discard the data sample as not corresponding to any reference data strings 46.0-46.n or to identify that the data sample may correspond to one of the data strings 46.0-46.n. In an example embodiment, K (e.g., consecutive or non-consecutive) bits are provided and the root may have $2^K$ pointers such that a pointer value V points to all strings that have the value K for the binary value expressed by those K bits. For example, if K=1, the root node may have a bit position (e.g., X), a zero pointer 75, and a one pointer 77. In this example case, the zero pointer 75 may point to all strings that have position X=0, and the one pointer 77 may point to all strings that have position X=1. The process may be repeated recursively within each sub-tree using a different set of bits at each node. Eventually, the bit tree may end up with leaf nodes that have exactly one possible matching string. The example show traversal of the bit tree one bit at a time, the scheme can be generalized to use multiple bits at each step.

In an example embodiment, the third processing stage 36 performs an actual comparison of the entire reference string with the actual data provided in the input packet 40. As discussed above, the first processing stage 32 may define a probabilistic offset checking stage and may provide an indication that it is likely that a match will occur with some string among the N possible reference strings 46.0-4.8n. The second processing stage 34 may narrow down the possibilities to one possible reference string 46.0-46.n. As the processing in the first processing stage 32 and in the second processing stage 34 is based on anchor strings 48.0-48.n which are only a part or portion of the total reference string 46.0-46.n, the processing in the first and second stages 32, 34 may not conclusively identify whether the reference string is present in the input packet 40 (it may conclusively identify that the reference string is not present). Thus, the third processing stage 34 may be provided to perform an exact comparison between the reference string identified in the second processing stage 34 and the actual content in the input packet 40. It will be appreciated that, as a result of the multi-stage approach to processing the data sample in the window, the time consuming and computationally intensive third processing stage 36 need only be performed after it has been ascertained with reasonable certainty that the data sample could very likely include the reference string.

In order to compare an identified reference string 46.0-46.n with the content in the input packet 40, a data fetch may be performed which obtains an offset of the window, the width of the window, and the actual string in the data packet 40. Returning to the example above relating to processing the input packet 40 showing the data sample string "JOHN SMITH". Where, for example, a hash function on a minimum length window of width L is used, where L is the length of the shortest reference string, the first four characters or the last four characters may be processed. For example, if the first four characters are processed, the data sample would include "JOHN" and, if the last four characters are processed the data sample would include "MITH". Thus, if the first four characters are used the first and second processing stages 32, 34 would identify the sample string as a potentially relevant string but would also identify "JOHN DOE" as a potentially relevant string. It is however to be appreciated that any L consecutive characters may be used as the data sample.

When performing second stage of processing, the a data fetch may in the given example contain an offset of –6 (corresponding to the characters "JOHN" and the space between "JOHN" and "SMITH" and the length of the data sample in the given example is 10). It is important to note in the given example the match may occur with the last four characters of the string and thus, for example, the processing in the first processing stage 32 and the second processing stage 34 has identified that "MITH" (or the "JOHN" as dependent upon the data sample selected) is present in the data sample but, it will be appreciated, that any other characters may also have preceded the characters "MITH". Thus it cannot be said with certainty the reference string "JOHN SMITH" is present in the packet. Accordingly, the third processing stage 36 may do an actual character by character comparison to ensure that the entire reference string is present in the input packet 40. In the given example, a final comparison would need to start six characters before the first character matched in the anchor string in order to perform a full comparison.

Figure 7:
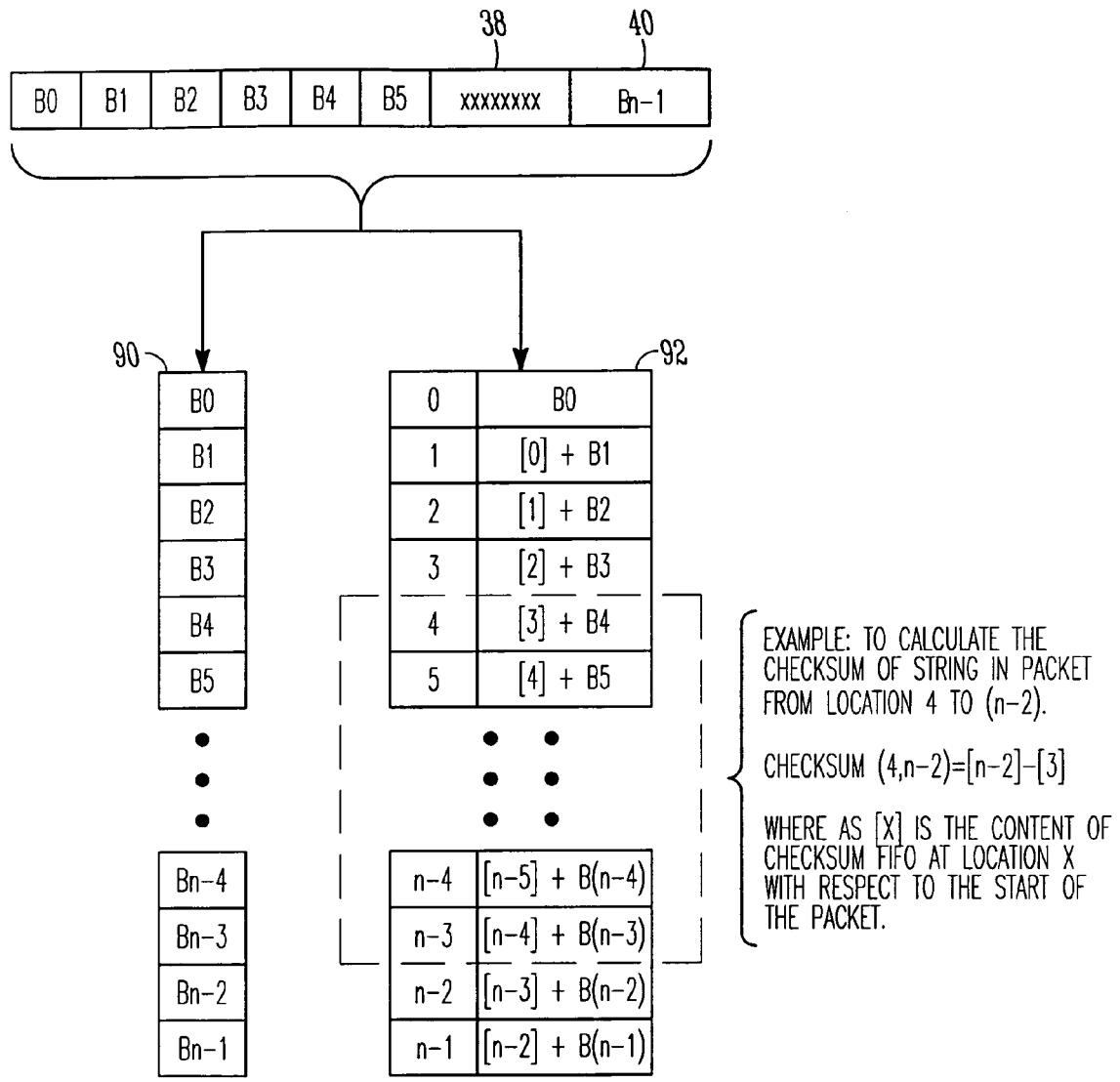
FIG. 7 shows an example packet FIFO and checksum FIFO.

In an example embodiment, prior to carrying out a complete comparison (e.g., bit-by-bit) in the third processing stage 36, a further or intermediate stage of processing is performed. In particular, as shown in FIG. 7, data from the input packet 40 after multi-stage filter processing is stored in a packet buffer (e.g., a packet FIFO buffer) 90 and a packet checksum buffer (e.g., a packet checksum FIFO buffer) 92 is generated. In an embodiment, the packet FIFO buffer 90 is omitted as the packet may be reconstructed from the checksum buffer 92. In the packet checksum buffer 92 bytes in the input packet 40 are summed so that, for example, data stored in a location 5, comprises a sum of the first 5 bytes of the packet 40. The checksum over any sub section of the packet can be computed quickly by subtracting the checksum data from the beginning and end of the sub section as shown in FIG. 7. As described in more detail below, with reference to FIG. 12, the intermediate processing stage compares a checksum in the packet checksum buffer 92 with a reference checksum provided in the reference strings database 20. If the checksums do not match, it will be appreciated that it is not necessary to perform the computationally or time consuming functionality described in the third processing step 36. However, if the checksums do match, the possibility exists that the reference string is in the packet.

Figure 8:
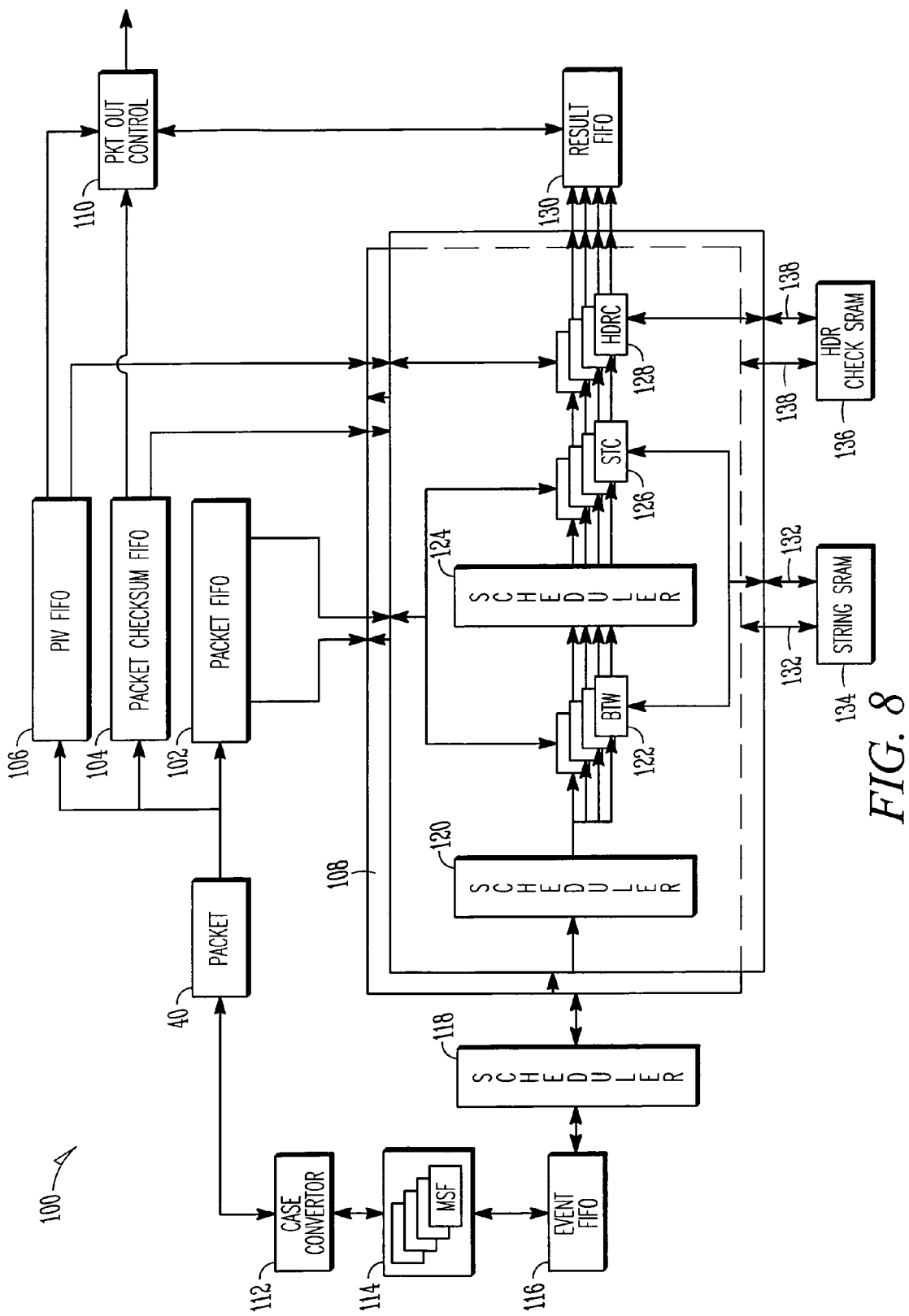
FIG. 8 shows example architecture of apparatus including the functionality of the content classification engine of FIG. 2.

FIG. 8 shows example architecture of apparatus 100 including the functionality of the content classification engine 30 (see FIG. 2). The apparatus 100 receives a packet 40 which is then fed into a packet FIFO 102, into a packet checksum FIFO 104 and into a Packet Information Vector (PIV) FIFO 106. The FIFOs 102, 104, 106 feed data into a processing module 108 and into a packet output control module 110. Data from the packet 40 is also fed into a case converter 112 and into a plurality of multi-stage filters 114 (see the first processing stage 32 in FIG. 2). Data from the multi-stage filters 114 is then fed into an event FIFO 116 and into a scheduler 118. The scheduler 118 is in communication with the processing module 108. The processing module 108 includes a further scheduler 120 which feeds a plurality of bit tree walkers 122 (see the second processing stage 34 in FIG. 2) which, in turn, feeds a further scheduler 124. The scheduler 124 feeds a plurality of extraction and string compare components 126 (see the third processing stage 36 in FIG. 2) which, in turn, feed a plurality of header check modules 128. The header check modules 128 check headers of the packets and, in turn, feed a result FIFO 130 which communicates with the packet output control module 110. As shown by arrows 132, the processing module 108 accesses reference strings in memory such as SRAM 134. As described above with reference to the content classification engine 30, the multi-stage filter 114 may be provided on-chip and the SRAM 134 may likewise be provided on-chip. In a similar fashion, the processor 108 communicates with header check SRAM 136 as shown by arrows 138. In an embodiment, the functionality described herein with reference to the content classification engine 30 may be performed by the apparatus 100.

Figure 9:
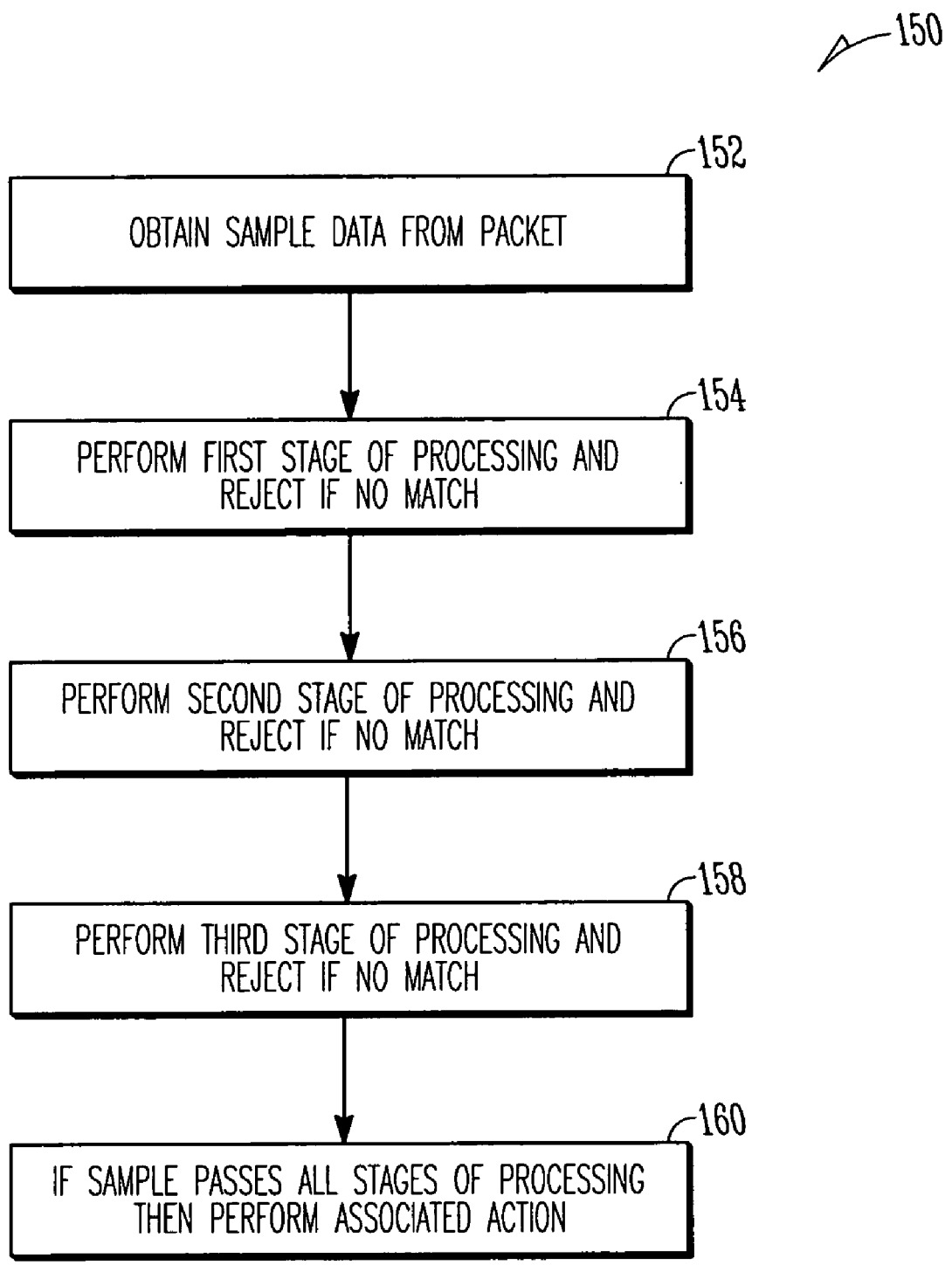
FIG. 9 shows a method, in accordance with an example embodiment, of identifying content in a packet.

Reference 150 (see FIG. 9) generally indicates a method, in accordance with an example embodiment, of identifying content in a packet. The method 150 may be performed by the content classification engine 30 and, accordingly, is described by way of example with reference thereto. As shown at block 152, a data sample may be obtained from a packet 40. Thereafter, as shown at block 154, the method 150 performs a first stage of processing (e.g., via the first processing stage 32) in which, at a high level, a determination be made of the likelihood of the data sample including a predefined reference string. If the functionality performed in block 154 determines that the data sample does not potentially correspond to any one of the references strings, no further data analysis on the particular data sample is performed thereby saving unnecessary computational time. If, however, the data sample corresponds to one of the reference strings (e.g., an anchor string of the reference string), the method 150 proceeds to block 156 where a second stage of processing is performed on the data sample. For example, as hereinbefore described, the second processing stage may use a bit tree to identify a particular group of reference strings 46.0-46.n that the data sample may correspond to. Thereafter, a bit tree search process is performed to identify the particular reference string of the group of reference strings. A comparison may then be performed between the data sample and a string anchor used to generate the bit tree. It will be appreciated that even if the data sample matches the anchor string, it does not necessarily mean that the reference string is present in the packet 40 as the anchor string is only a portion of the reference string. However, if the data sample does not match the anchor string, it can be said with certainty that the content in the input packet 40 does not include the reference string associated with the anchor string. If, however, the anchor string matches the data sample, a full comparison between the entire reference string and the content in the input packet 40 may be performed (see block 158).

It will be appreciated that various actions or functions may be performed when it is identified that the content in the input packet 40 includes any one of the reference strings. For example, as shown at block 160, if the data sample passes all the stages of processing, then an action associated with the string may be performed. For example, in a content routing scenario, the action may include adding data to a packet header to allow content routing.

Figure 10:
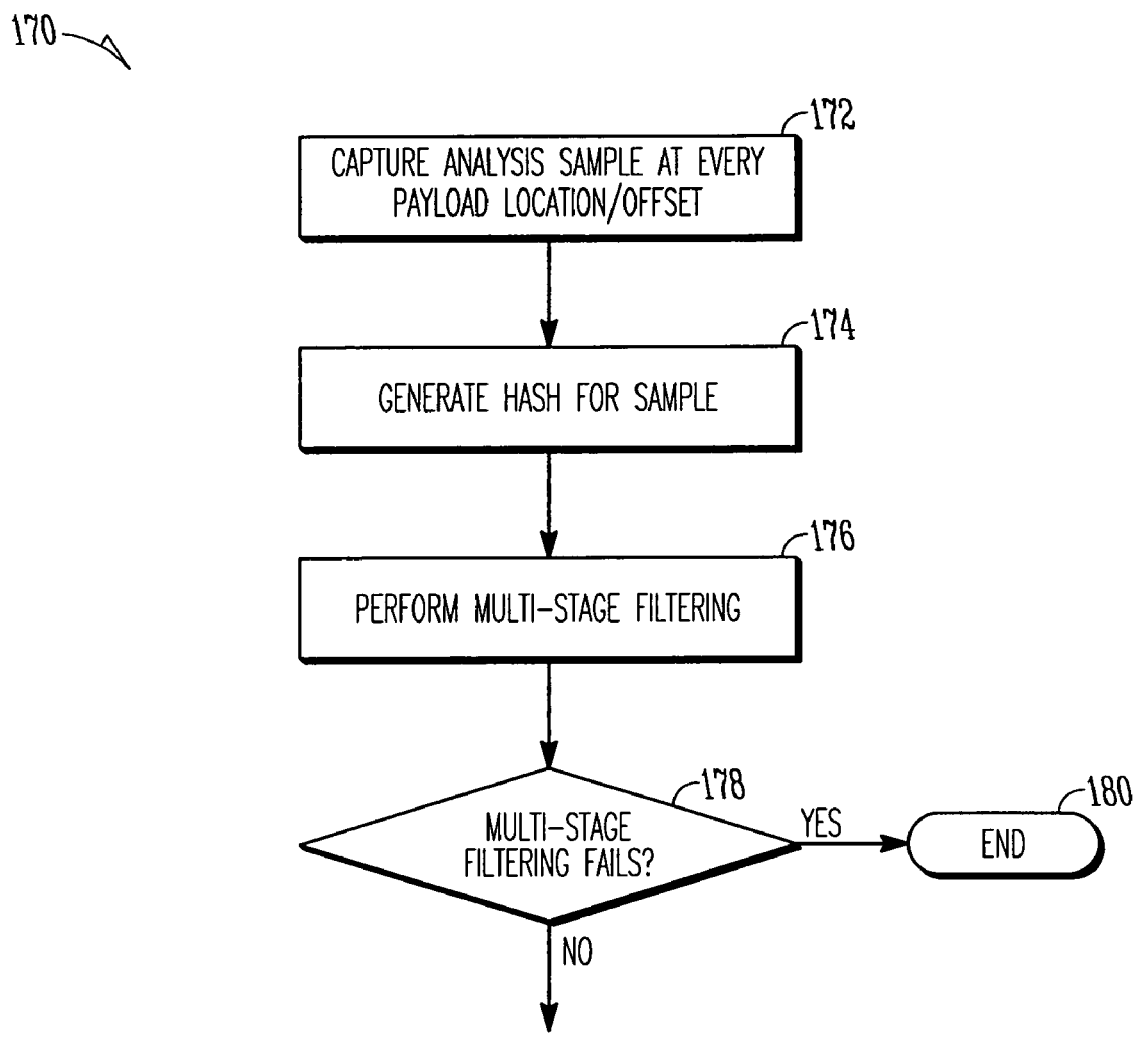
FIG. 10 shows a method, in accordance with an example embodiment, which may be performed in a first stage of processing.

FIG. 10 shows a method 170, in accordance with an example embodiment, which may be performed at block 154 in the method 150. As shown at block 172, a data sample or analysis sample may be captured at every payload location or offset in an input packet (e.g., the input packet 40). Thereafter, a hash may be generated for the sample (see block 174) using a hash function (e.g., the hash function/component 42 in FIG. 2). Multi-stage filtering is then performed at block 176 (e.g., multi-stage filtering by the multi-stage filter 44). As shown at decision block 178, a determination is made whether or not a "fingerprint" of the data sample matches the "fingerprint" (e.g., an anchor string) or data stored in the multi-stage filter corresponding to the reference strings. If there is no match, then the method 170 terminates as shown at block 180. If, however, a corresponding "fingerprint" is found, there is a likelihood that the data sample corresponds to a reference string provided in a reference string database (e.g., the reference strings database 20 shown in FIG. 1). If the multi-stage filtering process does not fail, then the method 170 may proceed to perform further analysis on the data sample.

Figure 11:
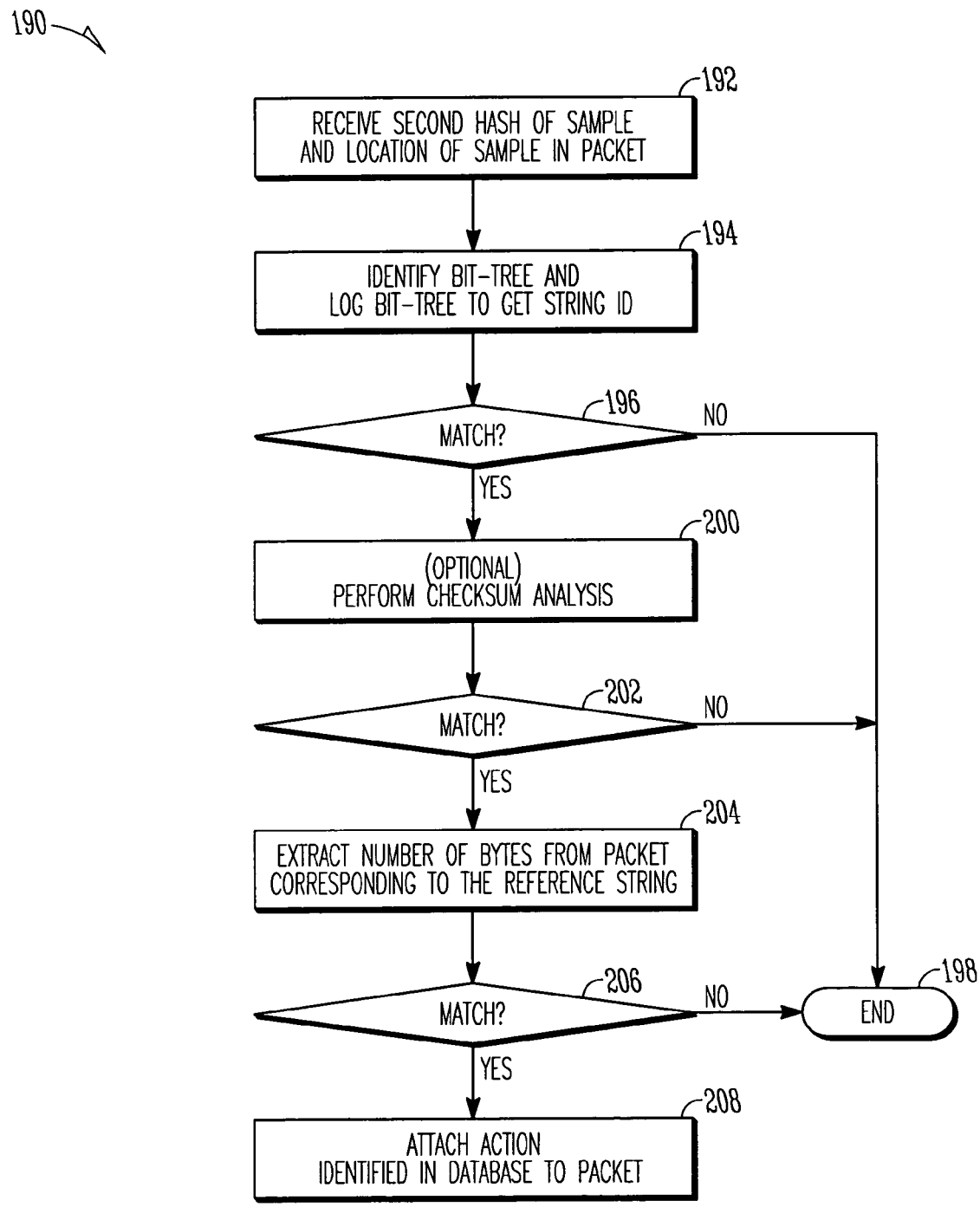
FIG. 11 shows a method, in accordance with an example embodiment, to identify a potential reference using a bit tree.

FIG. 11 shows a method 190, in accordance with an example embodiment, which may be performed in block 156 of the method 150. As shown at block 192, the method 190 may receive a second hash of a data sample as well as a location of the sample in a packet (e.g., the packet 40). For example, the second hash may be generated by the second hash function/component 60 and the offset or location of the data sample in the input packet 40 may be received. Thereafter, as shown at block 194, the second hash is used to identify a bit tree and a log bit tree to get a string identification (identify a single potentially relevant string). Thus, as described hereinbefore, the block 194 may identify a group of reference strings in which a potentially relevant reference string corresponding to the data sample is located.

As shown at decision block 196, if the second hash function does not index or correspond to any one of the tree root pointers, it can be concluded that the data sample does not correspond to any one of the reference strings and, accordingly, the method 190 may proceed to block 198 where the investigation for the particular data sample is terminated. If, however, the second hash identifies a particular root pointer, an optional checksum analysis may be performed at block 200 (see also FIG. 7). In an embodiment, the checksum is analysis is performed on the entire string. As shown at block 202, if there is no checksum match, then the method 190 proceeds to block 198 where it terminates as it has been determined that the data sample does not correspond to any one of the reference strings. If, however, the checksum does match, then a number of bytes are extracted from the packet to see if they correspond to the reference string. As shown at decision block 206, if the data sample does not correspond to the reference string then the method 190 terminates as it has been determined that the data sample does not correspond to any one of the reference strings. If, however, the reference string corresponds to the content in the data packet, then a particular action may be performed as shown at block 208. For example, an action provided in a reference database may be attached to the packet.

Figure 12:
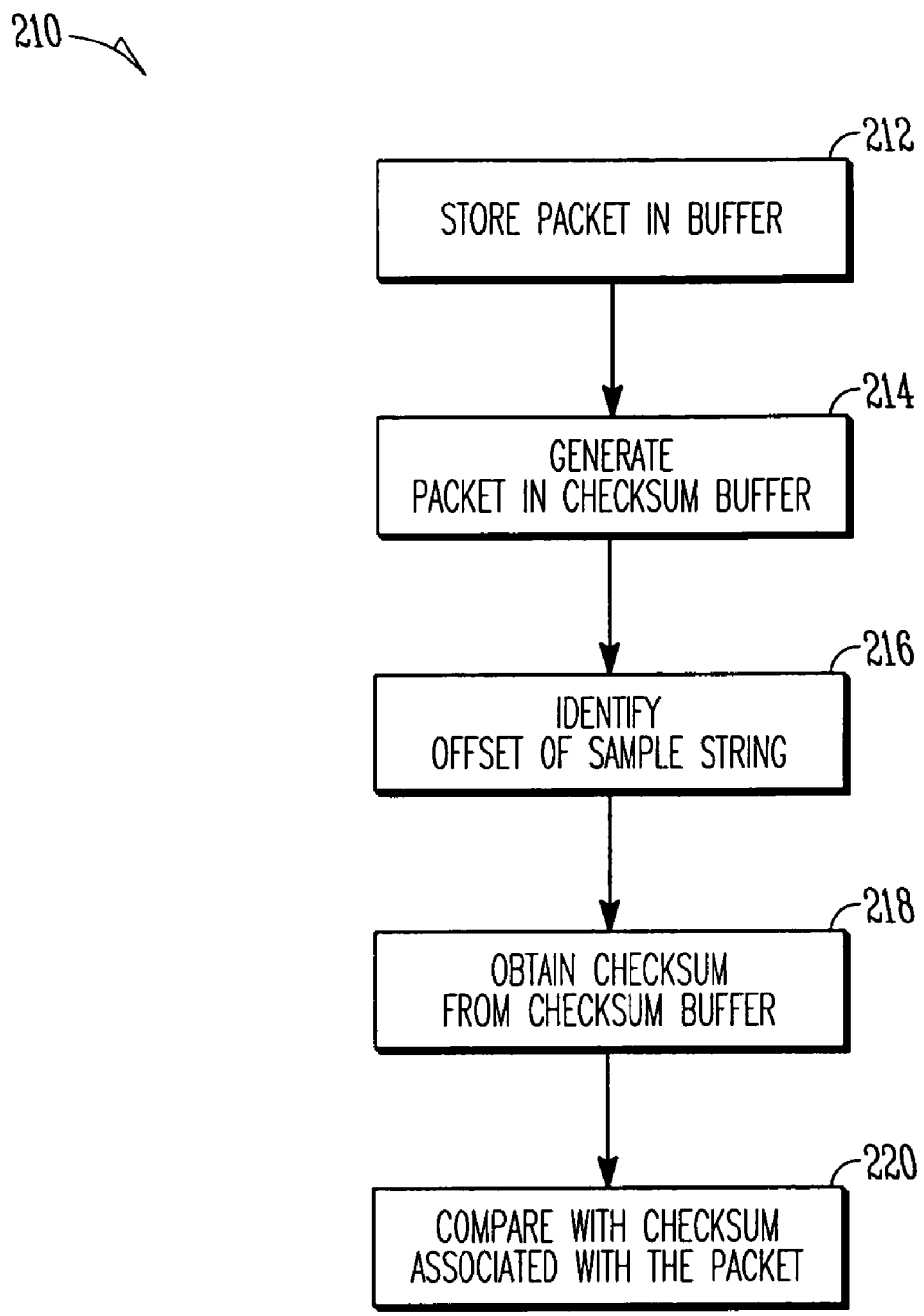
FIG. 12 shows a method, in accordance with an example embodiment, to perform checksum processing that compares a checksum of a reference string to a checksum of data in an input packet.

Referring to FIG. 12, reference 210 generally indicates a method, in accordance with an example embodiment, to perform checksum processing that compares a checksum of a reference string to a checksum of data in an input packet. The method 210 may be deployed in the content classification engine 30 and, accordingly, is described by way of example with reference thereto. As shown at block 212, a packet (e.g., an input packet 40) may be stored in an input buffer. Thereafter, a packet checksum buffer is populated (see block 214 and the packet checksum buffer 92 in FIG. 7). As shown at block 216, an offset of the sample string may be identified and, thereafter, a checksum from the checksum buffer may be obtained (see block 218). The method 210 may then compare the checksum obtained from the checksum buffer with the checksum associated with the reference string and provided in the reference strings database 20.

Although the various embodiments have been described with reference to identification of content in a packet, it will be appreciated that the apparatus and methodologies described herein may be used to identify any reference digital "fingerprint" (e.g., reference strings) in any digital content.

Figure 13:
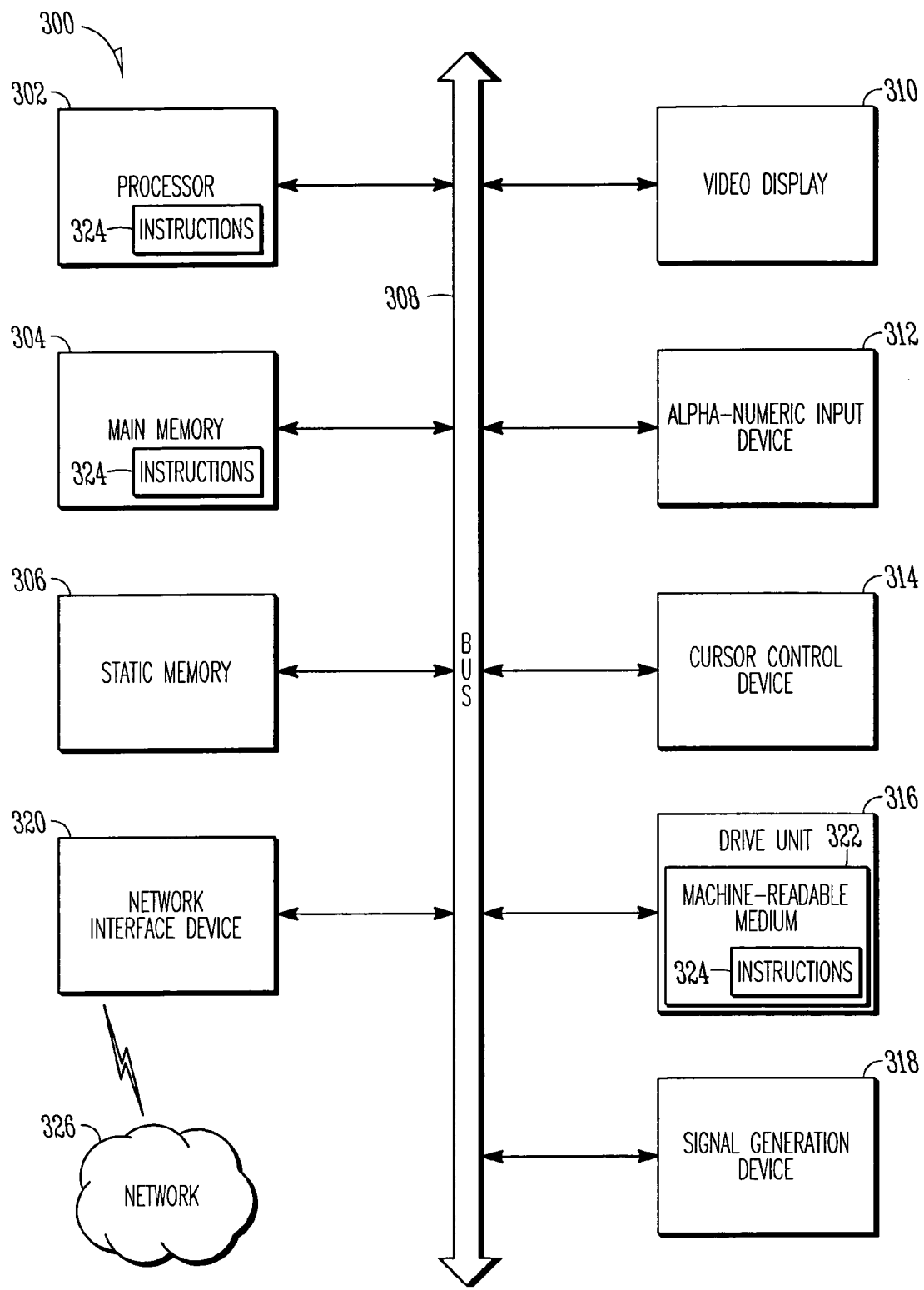
FIG. 13 shows a diagrammatic representation of machine in the example form of a computer system within which a set of instructions, for causing the machine to perform any one or more of the methodologies discussed herein, may be executed.

FIG. 13 shows a diagrammatic representation of machine in the example form of a computer system 300 within which a set of instructions, for causing the machine to perform any one or more of the methodologies discussed herein, may be executed. It will be appreciated that some of the components of the computer system 300 may be omitted in different embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. One or more components of the machine may be a personal computer (PC), a tablet PC, a set-top box (STB), a Personal Digital Assistant (PDA), a cellular telephone, a web appliance, a network router, switch or bridge, a port card, a line card, a service card or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include storage medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include storage devices, solid-state memories, optical and magnetic storage media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of identifying content in a packet, the method comprising:
    obtaining a data sample from the packet, the data sample being in a predetermined window at an initial offset point in the packet;
    for each offset point,
        performing a first stage of processing on the data sample to obtain a first stage result, the first stage result identifying that the data sample corresponds to a potentially relevant reference string retrieved from memory;
        based on the first stage result, performing a second stage of processing on the data sample to obtain a second stage result, the second stage result identifying that the data sample corresponds to the potentially relevant reference string;
        based on the second stage result, performing a third stage of processing on the data sample to obtain a third stage result, the third stage of processing on the data sample comprising performing a comparison between the potentially relevant reference string identified in the second stage and the actual content of the packet associated with a payload location, the first, second, and third stage of processing being performed by a processor; and
        based on the third stage result, identifying a predefined action associated with the potentially relevant reference string corresponding to the data sample.

2. The method of claim 1, wherein performing the first stage of processing comprises:
    deriving a first hash from the data sample; and
    querying a multi-stage filter with the first hash to obtain the first stage result.

3. The method of claim 2, wherein the multi-stage filter is preconfigured with multi-stage filter data by hashing a plurality of anchor strings obtained from reference strings in a reference database using the first hash for subsequent querying.

4. The method of claim 3, wherein the plurality of anchor strings are obtained at any offset in an associated reference string.

5. The method of claim 2, which comprises:
    indexing a plurality of individual bit arrays of the multi-stage filter utilizing the first hash, the status of indexed individual bits defining the first stage result; and
    where all the indexed individual bits are set to correspond to a reference string, proceeding to the second stage of processing.

6. The method of claim 2, which comprises:
    deriving a first hash and querying the multi-stage filter at a system operating speed; and
    deriving a second hash and using the second hash to index an array wherein indexing the array is performed at a speed lower than the system operating speed.

7. The method of claim 1, wherein performing the second stage of processing comprises deriving a second hash from the data sample and using the second hash to index an array.

8. The method of claim 7, wherein the array is a bit tree, the second hash defining a pointer used to index bit tree roots in the bit tree.

9. The method of claim 8, wherein the bit tree identifies a reference string from a plurality of reference strings.

10. The method of claim 1, wherein performing the first stage of processing comprises:
    deriving a first hash from the data sample in an on-chip buffer; and
    querying a multi-stage filter provided in on-chip memory with the first hash to obtain the first result.

11. The method of claim 1, wherein performing the second stage of processing indexes an array provided off-chip and the third stage of processing on the data sample includes performing a comparison with the reference string and the content of the packet, the reference string being provided in off-chip memory.

12. The method of claim 11, wherein the comparison can start before an offset in the packet where the data sample was located and the comparison can extend beyond a length of the data sample, where a starting position and the length are specified by a result of a bit tree search.

13. The method of claim 1, wherein the predefined action is one of a block action, a TCP reset action, an alert action, a log action, a route action, and a rate limit action.

14. A computer-readable medium embodying instructions which, when executed by a computer, cause the computer to:
  obtain a data sample from the packet, the data sample being in a predetermined window at an initial offset point in the packet;
  for each offset point,
    perform a first stage of processing on the data sample to obtain a first stage result, the first stage result identifying that the data sample corresponds to a potentially relevant reference string retrieved from memory;
    based on the first stage result, perform a second stage of processing on the data sample to obtain a second stage result, the second stage result identifying that the data sample corresponds to the potentially relevant reference string;
    based on the second stage result, perform a third stage of processing on the data sample to obtain a third stage result, the third stage of processing on the data sample comprising performing a comparison between the potentially relevant reference string identified in the second stage and the actual content of the packet associated with a payload location, the first, second, and third stage of processing being performed by a processor; and
    based on the third stage result, identify a predefined action associated with the potentially relevant reference string corresponding to the data sample.

15. An apparatus to identify content in a packet, the apparatus comprising:
  a memory comprising a packet buffer to buffer the packet; and
  a content processor coupled to the memory that obtains a data sample in a predetermined window at an initial offset point in the packet, the content processor comprising:
    a first processing stage that performs a first stage of processing on the data sample to obtain a first stage result, the first stage result identifying that the data sample corresponds to a potentially relevant reference string retrieved from the memory;
    a second processing stage that, based on the first stage result, performs a second stage of processing on the data sample to obtain a second stage result, the second stage result identifying that the data sample corresponds to the potentially relevant reference string; and
    a third processing stage that, based on the second stage result, performs a third stage of processing on the data sample to obtain a third stage result, the third stage of processing on the data sample comprising performing a comparison between the potentially relevant reference string identified in the second stage and the actual content of the packet associated with a payload location, and wherein based on the third stage result, a predefined action is performed that is associated with the potentially relevant reference string corresponding to the data sample.

16. The apparatus of claim 15, wherein the first stage comprises a multi-stage filter, the first processing stage deriving a first hash from the data sample and querying the multi-stage filter with the first hash to obtain the first stage result.

17. The apparatus of claim 16, wherein the multi-stage filter is preconfigured with multi-stage filter data by hashing a plurality of anchor strings obtained from reference strings in a reference database using the first hash for subsequent querying.

18. The apparatus of claim 17, wherein the plurality of anchor strings are obtained from at any offset in an associated reference string.

19. The apparatus of claim 16, wherein the multi-stage filter comprises a plurality of individual bit arrays, the first processing stage indexing the plurality of individual bit arrays utilizing the first hash, the status of indexed individual bits defining the first stage result and wherein all indexed individual bits are set to correspond to a reference string, processing in the second processing stage is performed.

20. The apparatus of claim 16, wherein the first processing stage derived the first hash and queries the multi-stage filter at a system operating speed, and the second processing stage derives a second hash and uses the second hash to index an array wherein indexing the array is performed at a speed lower than the system operating speed.

21. The apparatus of claim 15, wherein the second processing stage derives a second hash from the data sample and uses the second hash to index an array.

22. The apparatus of claim 21, wherein the array is a bit tree, the second hash defining a pointer used to index bit tree roots in the bit tree.

23. The apparatus of claim 22, wherein the bit tree identifies a reference string from a plurality of reference strings.

24. The apparatus of claim 15, wherein the comparison can start before an offset in the packet where the data sample was located and the comparison can extend beyond a length of the data sample, where a starting position and the length are specified by a result of a bit tree search.

25. The apparatus of claim 15, wherein the first processing stage derives a first hash from the data sample in an on-chip buffer and queries a multi-stage filter provided in on-chip memory with the first hash to obtain the first result.

26. The apparatus of claim 15, wherein the second processing stage indexes an array provided off-chip and the third processing stage performs a comparison with the reference string and content of the packet, the reference string being provided in off-chip memory.

27. The apparatus of claim 15, wherein the predefined action is one of a block action, a TCP reset action, an alert action, a log action, a route action, and a rate limit action.

28. The apparatus of claim 15, wherein the packet buffer and content processor are integrated within one of a switch and a router.

29. An apparatus to identify content in a packet, the apparatus comprising:
  means for obtaining data sample from the packet, the data sample being in a predetermined window at an initial offset point in the packet;
  means for performing a first stage of processing on the data sample to obtain a first stage result, the first stage result identifying that the data sample corresponds to a potentially relevant reference string retrieved from memory;
  based on the first stage result, means for performing a second stage of processing on the potentially relevant data sample to obtain a second stage result, the second stage result identifying that the data sample corresponds to the potentially relevant reference string;

based on the second stage result, means for performing a third stage of processing on the data sample to obtain a third stage result, the third stage of processing on the data sample comprising performing a comparison between the potentially relevant reference string identified in the second stage and the actual content of the packet associated with a payload location; and based on the third stage result, means for identifying a predefined action associated with the potentially relevant reference string corresponding to the data sample.

30. A method of identifying content in a packet, the method comprising:
  obtaining a data sample from the packet, the data sample being in a predetermined window at an initial offset point in the packet;
  for each offset point,
    deriving a first hash from the data sample;
    querying a multi-stage filter with the first hash to obtain a first stage result, the first stage result identifying that the data sample corresponds to a potentially relevant reference string retrieved from memory, the multi-stage filter being preconfigured with multi-stage filter data by hashing a plurality of anchor strings obtained from reference strings in a reference database, the plurality of anchor strings being obtained at any offset in an associated reference string;
  based on the first stage result, performing a second stage of processing on the data sample to obtain a second stage result, the second stage result identifying that the data sample corresponds to the potentially relevant reference string;
  based on the second stage result, performing a third stage of processing on the data sample to obtain a third stage result, the third stage of processing on the data sample comprising performing a comparison between the potentially relevant reference string identified in the second stage and the actual content of the packet; and
  based on the third stage result, identifying a predefined action associated with the potentially relevant reference string corresponding to the data sample.

31. An apparatus to identify content in a packet, the apparatus comprising:
  a memory comprising a packet buffer to buffer the packet; and
  a content processor coupled to the memory and that obtains a data sample in a predetermined window at an initial offset point in the packet, the content processor comprising:
    a first processing stage that derives a first hash from the data sample and queries a multi-stage filter with the first hash to obtain a first stage result identifying that the data sample corresponds to a potentially relevant reference string retrieved from the memory, the multi-stage filter preconfigured with multi-stage filter data by hashing a plurality of anchor strings obtained from reference strings in a reference database, the plurality of anchor strings being obtained from at any offset in an associated reference string;
    a second processing stage that, based on the first stage result, performs a second stage of processing on the data sample to obtain a second stage result, the second stage result identifying that the data sample corresponds to the potentially relevant reference string; and
    a third processing stage that, based on the second stage result, performs a third stage of processing on the data sample to obtain a third stage result, the third stage of processing on the data sample comprising performing a comparison between the potentially relevant reference string identified in the second stage and the actual content of the packet, and wherein based on the third stage result, a predefined action is performed that is associated with the potentially relevant reference string corresponding to the data sample.

* * * * *

UNITED STATES PATENT AND TRADEMARK OFFICE
CERTIFICATE OF CORRECTION

PATENT NO. : 7,602,780 B2  Page 1 of 1
APPLICATION NO. : 11/271310
DATED : October 13, 2009
INVENTOR(S) : Singh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 737 days.

Signed and Sealed this

Fifth Day of October, 2010

David J. Kappos
*Director of the United States Patent and Trademark Office*